United States Patent
Liu

(10) Patent No.: US 11,327,727 B2
(45) Date of Patent: May 10, 2022

(54) SYSTEMS AND METHODS FOR INTEGRATING MODULES INTO A SOFTWARE APPLICATION

(71) Applicant: PAYPAL, INC., San Jose, CA (US)

(72) Inventor: Yang Liu, Daly City, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/725,358

(22) Filed: Dec. 23, 2019

(65) Prior Publication Data

US 2020/0210155 A1 Jul. 2, 2020

Related U.S. Application Data

(63) Continuation of application No. 16/009,851, filed on Jun. 15, 2018, now Pat. No. 10,514,897.

(51) Int. Cl.
*G06F 9/44* (2018.01)
*G06F 8/36* (2018.01)

(52) U.S. Cl.
CPC ...................................... *G06F 8/36* (2013.01)

(58) Field of Classification Search
CPC ........................................................ G06F 8/36
See application file for complete search history.

(56) References Cited

U.S. PATENT DOCUMENTS

| | | | |
|---|---|---|---|
| 2009/0037829 A1* | 2/2009 | Sun | G06F 8/00 715/762 |
| 2009/0037896 A1 | 2/2009 | Grechanik et al. | |
| 2009/0144709 A1 | 6/2009 | Donohue et al. | |
| 2009/0158237 A1 | 6/2009 | Zhang et al. | |
| 2009/0265760 A1 | 10/2009 | Zhu et al. | |
| 2009/0313601 A1* | 12/2009 | Baird | G06F 8/34 717/106 |
| 2010/0125826 A1* | 5/2010 | Rice | G06F 16/9535 717/107 |
| 2011/0209162 A1 | 8/2011 | Machiraju et al. | |

(Continued)

OTHER PUBLICATIONS

"Crashlytics for iOS—Fabric Install", Fabric, 3 Pages [Online], [retrieved on Jun. 15, 2018]. Retrieved from the Internet: <URL:https://fabric.io/kits/ios/crashlytics/install>.

(Continued)

*Primary Examiner* — Hang Pan
(74) *Attorney, Agent, or Firm* — Haynes and Boone, LLP

(57) ABSTRACT

Methods and systems are presented for providing a platform that seamlessly integrates software modules into an application. In particular, the platform allows software modules to access services provided by other software modules, through a host module, without the need of exposing the source code of any of the software modules. The application is configured as a host module by integrating one or more software modules into the application. The application may directly consume services provided by the software modules and also facilitate service accessing between software modules that are integrated into the application. As such, a software module does not need to interact with another software module directly to access services provided by the other software module, but rather, using the application as a medium to interact with the other software module.

20 Claims, 7 Drawing Sheets

(56) References Cited

U.S. PATENT DOCUMENTS

| | | | |
|---|---|---|---|
| 2013/0138704 A1* | 5/2013 | Grateau | H04L 67/02 707/821 |
| 2013/0185348 A1* | 7/2013 | Hall | G06Q 10/0633 709/203 |
| 2014/0040863 A1* | 2/2014 | Hale | G06F 8/36 717/123 |
| 2018/0081639 A1* | 3/2018 | Collins | G06F 8/36 |

OTHER PUBLICATIONS

"Postman is the Only Complete API Development Environment", Postdot Technologies, Inc., 9 Pages [Online], [retrieved on Jun. 15, 2018], Retrieved from the Internet: <URL:http://www.getpostman.com/products>.

"What is OpenAPI", SmartBear Software, 2 Pages [Online], [retrieved on Jun. 15, 2018], Retrieved from the Internet: <URL:https://swagger.io/docs/specification/about/>.

* cited by examiner

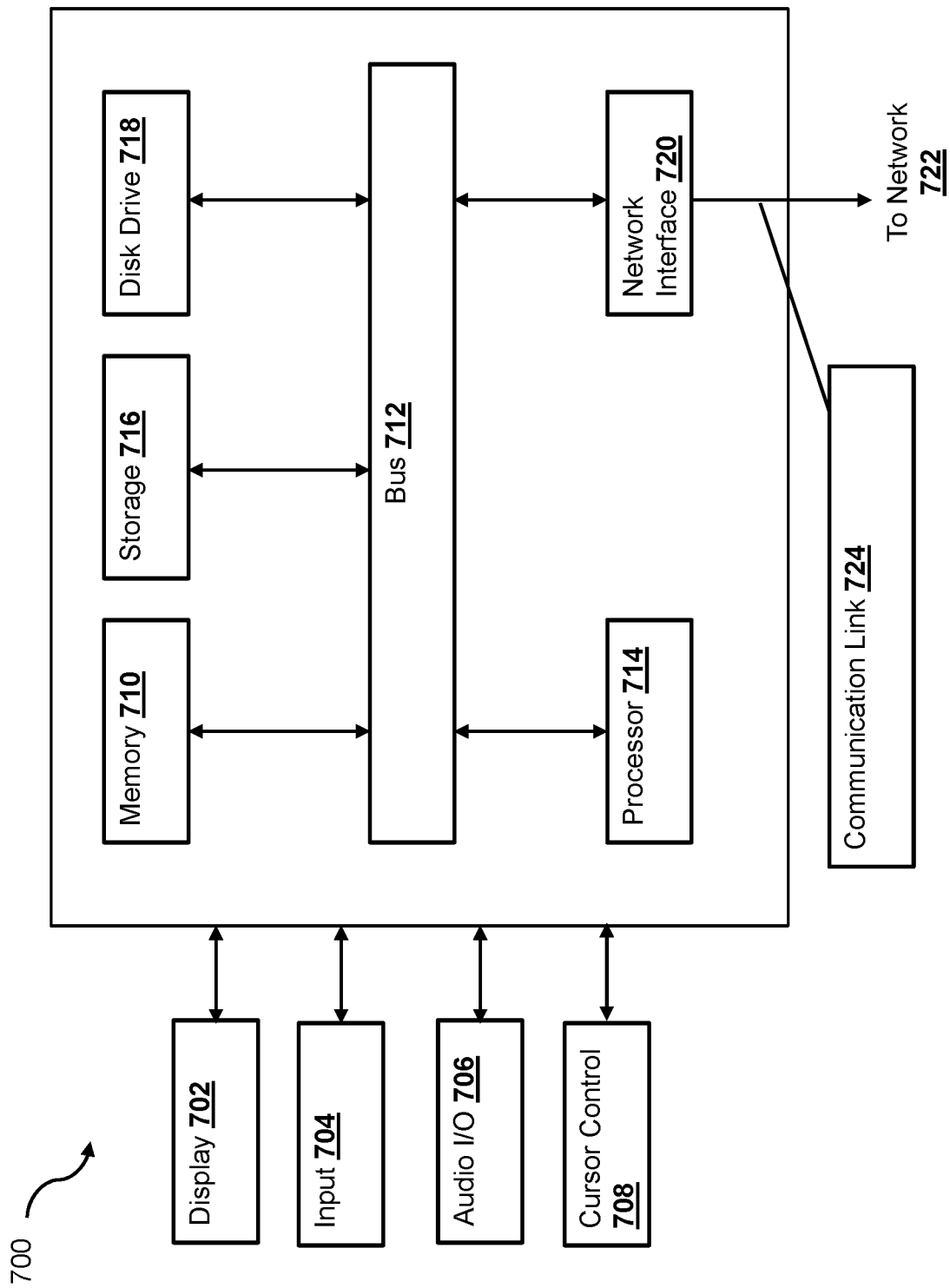

SYSTEMS AND METHODS FOR INTEGRATING MODULES INTO A SOFTWARE APPLICATION

CROSS-REFERENCE TO RELATED APPLICATIONS

This application is a continuation of U.S. patent application Ser. No. 16/009,851, filed Jun. 15, 2018 which is herein incorporated by reference in its entirety.

BACKGROUND

The present specification generally relates to software application integration, and specifically, to providing a platform for integrating modules into a software application.

RELATED ART

When developing software applications, it is common to re-use programming code developed by others to save time and resources. For example, commonly used features or functionalities can be encapsulated within one or more software modules that can be accessed by other applications or modules via function calls. However, even when the software modules have been built to provide the features or functionalities, the software module may not be compatible to work with every application. For example, some of the applications may be written in a different programming language than the software module. Further, in order to access the features or functionalities within the software module, the interface of the software module needs to be exposed to a developer of an application. The developer may gain access to the interface of the software module by reviewing the source code of the software module. However, the source code of the application may not always be available to the application developers, especially when the software module was developed by an organization different from the one that develops the application.

Thus, there is a need for providing a platform for seamlessly integrating software modules into an application.

BRIEF DESCRIPTION OF THE FIGURES

FIG. 7 is a block diagram of a system for implementing a device according to an embodiment of the present disclosure.

Figure 1:
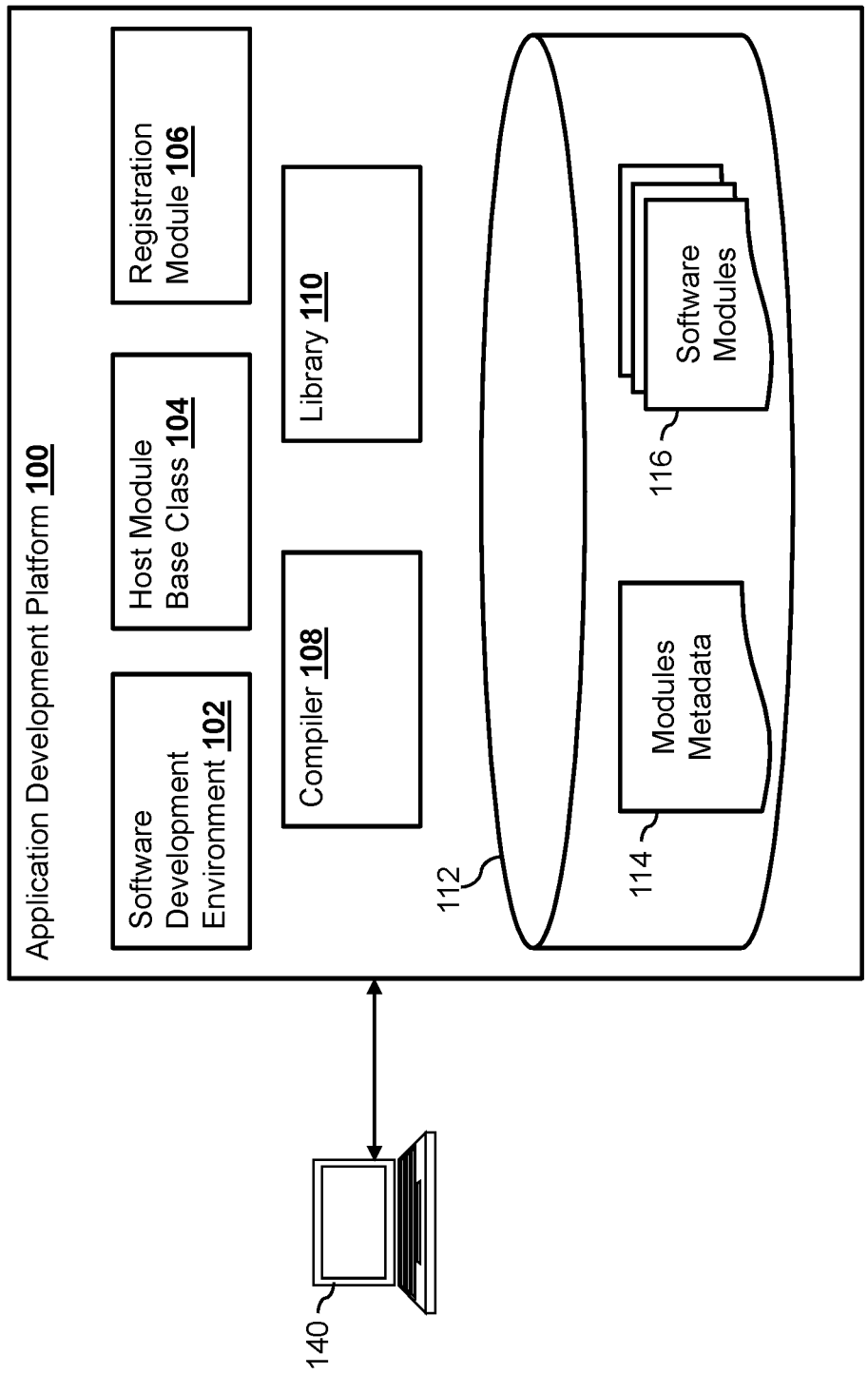
FIG. 1 is a block diagram illustrating an application development platform according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a platform for seamlessly integrating software modules into an application. In particular, the platform allows software modules to access services provided by other software modules, through a host module, without the need of exposing the source code of any of the software modules. A software module may be a stand-alone software unit that provides services to an application or to another software module. In some embodiments, in order for a software module to be integrated with an application, the software module may first be registered with the platform. During the registration process, each software module may indicate to the platform one or more services that the software module may provide to other applications or modules and the interfaces (e.g., application programming interfaces (APIs), etc.) for accessing the services. The services and the interface provided by each software module may be stored in a data store of the platform. The service module may then be stored in the platform as compiled executable code. In some embodiments, the compiled executable code is readable by the machine but not readable by a human. This way, the source code of the service module can remain hidden from developers of the application and other software modules. Once the software module is registered with the platform, the software module is readily integrate-able within any applications.

An application developed within the platform may consume services provided by one or more software modules and facilitate service accessing among the software modules. In some embodiments, the application may be configured to be a host module for integrating one or more of the software modules registered with the platform into the application. Once the software modules are integrated into the application, the application may directly consume services provided by the software modules, for example, via the API provided by the software modules.

In some embodiments, the platform includes a software development environment (e.g., an integrated development environment (IDE), etc.) that enables a human developer to develop software applications and/or modules. When the application is being developed, the platform may provide an interface that presents to the human developer a list of software modules that have been registered with the platform and services provided by the software modules, such that the human developer may integrate one or more of the software modules into the application and access the services provided by the software modules via the interface.

For example, as the human developer is writing source code for the application using the IDE, the platform may parse the source code in real-time to detect an indication that the human developer wants to integrate one or more software modules registered with the platform into the application. In response to detecting the indication, the platform may provide an interface (e.g., a pop-up window) that lists the identifiers of the software modules registered with the platform based on the information of the software modules stored in the data store. In one embodiment, the identifiers of the software modules may be selectable on the interface by the human developer, such that the human developer may select which software module to integrate into the application by making a selection on the interface (instead of manually typing the identifier of the software module).

Further, the platform may also detect an indication that the human developer wants to access a service provided by a software module integrated with the application. In response to detecting such an indication, the platform may also provide another interface (e.g., a pop-up window) that lists the services provided by the software modules integrated into the application based on the information stored in the data store. In one embodiment, the services may be selectable on the interface by the human developer, such that the human developer may select which service to access by making a selection on the interface (instead of manually typing the service).

In addition to consuming services provided by the software modules, the application may also facilitate service accessing between software modules that are integrated into the application. In some embodiments, in order to facilitate service accessing between software modules, the application may configure itself as a host module for the integrated software modules by implementing a set of predetermined functions defined by the platform. The predetermined functions may include a function for inquiring whether a service from a software module is accessible, a function for accessing a service of a software module, a function for providing a list of parameters required by a service (e.g., dependencies in a function call) of a software module, a function for indicating a requested service is completed, a function for inquiring an expected return value from a requested service, or a function for providing one or more return values based on a completion of a requested service. In some embodiments, the human developer may use the information stored in the data store of the platform to implement at least some of the predetermined functions. These functions may then be directly accessible by the software modules such that a software module integrated into the application may access a service of another software module via one or more function calls with the host module without having knowledge of the source code or the interface of the other software module.

For example, the application may initiate a first process flow by accessing a first service provided by a first software module integrated with the application. In some embodiments, the application may initiate the first process flow by using the API provided by the first software module (e.g., executing a function call of the first software module). In this example, while performing the first process flow, the first software module may utilize a second service provided by a second software module, such that the first software module need not implement the service itself. As discussed above, the platform enables software modules to access services of other software modules via a host module without having knowledge of the source code or the interface of the other software modules. As such, the first software module may interact with the application (configured as a host module) (e.g., by calling one or more of the predetermined functions implemented by the application) to inquire about the availability of and/or to access the second service provided by the second software module.

In this example, when the first software module calls a function of the application to inquire about the availability of the second service, the function, as implemented by the application, may enumerate the services that are provided by the software modules integrated into the application to determine whether the second service is available to the first software module, and may return a value that indicates to the first software module whether the second service is available. The first software module may perform different actions depending on the availability of the second service. For example, in the event that the second service is unavailable, the first software module may attempt to access another service (e.g., a third service provided by a third software module) via the host module, or perform the second service itself.

On the other hand, in the event that the second service is available, the first software module may access the second service by calling another one of the predetermined functions implemented by the application to access the second service. Upon receiving a request to access the second service provided by the second software module (e.g., via the predetermined function call), the application may initiate a second process flow associated with the second service of the second software module, for example, by using the API provided by the second software module. Similar to the first process flow, while performing the second process flow, the second software module may access services of other software modules in the same manner as described herein, through the application (as the host module). When the second process flow is completed, the second module may notify the application of the completion of the second process flow, such that the application may relay the completion status to the first software module.

In some embodiments, the second software module may return one or more values when the second process flow is completed. For example, the second service may include providing a credit score associated with a user account. In this example, the return value of the second process flow may include a computed credit score associated with the user account. As the application receives the value from the second software module at the completion of the second process flow, the application may then provide the first software module the value as a return value of the function call for accessing the second service initiated by the first software module.

It is noted that by calling the predetermined functions of the application to access services of another software module, the first software module does not need to interact with the other software modules directly, but rather, using the application (configured as the host module) as a medium to interact with the other software modules. In other words, the other software modules are insulated from the first software module, for example, the interface and/or the source code of the other software modules are hidden from the first module. Advantageously, using the service accessing scheme provided by the platform as disclosed herein, a software module may seamlessly access services provided by other software modules without having knowledge of the implementation (e.g., the source code and the interface) of the other software modules.

As discussed above, once the application initiates the first process flow (e.g., by accessing a service provided by a software module integrated with the application), the application may be called upon to initiate additional process flows associated with service provided by different software modules integrated with the application. Using the example discussed above, during the execution of the first process flow, the application may be requested by the first software module to initiate a second process flow by accessing a service provided by the second software module. It is contemplated that during the execution of the second process flow, the application may be requested by the second software module to access a service provided by a third software module, and so forth. As such, the application may have to manage and keep track of the different process flows initiated for the different software modules.

Different embodiments of the platform may use different techniques to enable the application to manage the process flows. In some embodiments, the platform provides a flow stack that the application may use to keep track of the process flows. The flow stack may be implemented as a data stack object configured in a first-in-last-out arrangement such that the most recent item that has been pushed into the flow stack is popped first. In some embodiments, whenever the application initiates a new process flow (e.g., by accessing a service of one of the software module), the application instantiates a new instance of the flow stack and pushes information about the process flow into the flow stack. For example, when the application initiates the first process flow by accessing the first service of the first software module, the application may instantiate a first flow stack and push information about the first process flow into the first flow stack. The information may include an identifier associated with the first service, an identifier associated with the first software module, and an identifier of the requestor (which is the application itself in this instance). As the application is requested to initiate an additional process flow (e.g., being called upon by the software module to access a service of another software module), the application may push information of the additional process flow into the flow stack. For example, when the application is requested by the first software module to initiate the second process flow associated with the second service of the second software module, the application may push information of the second process flow into the first flow stack. The information may include an identifier associated with the second service, an identifier associated with the second software module, and an identifier of the requestor (the first software module in this instance).

The application may continually push information of new process flows into the first flow stack when requests for initiating the new process flows are received. For example, the second software module may request to access a third service provided by a third software module, and the third software module may request to access a fourth service provided by a fourth software module, and so forth. The additional process flows (after the first process flow initiated directly by the application) may be referred to as sub-flows of the first process flow.

In some embodiments, when a process flow is completed, the application may pop the information associated with the process flow from the flow stack. For example, when the application is notified by the second software module that the second process flow is completed, the application may pop the information associated with the second process flow (since the information associated with the second process flow is the last one that was pushed into the first flow stack) from the first flow stack. Based on the information that was popped from the first flow stack, the application may determine that the second process flow is requested by the first software module, and may then notify the first software module the completion of the second process flow and may relay any value(s) provided by the second software module at the completion of the second process flow.

FIG. 1 illustrates an application development platform 100 for seamlessly integrating software modules into an application. The application development platform 100 includes a software development environment 102 (e.g., an integrated development environment (IDE), etc.) for providing an environment to develop software applications. The application development platform 100 also includes a host module base class 104 that defines a set of functions required to be implemented by a host module. The application development platform 100 also includes a registration module 106 for registering software modules, a compiler 108 for compiling an integrated software application, and a library 110 that includes programming code for common utility functions. For example, the library 110 may include programming code associated with a flow stack that can be utilized by one or more applications developed within the application development platform 100, as described herein.

The application development platform 100 also includes a data store 112 for storing binary codes associated with one or more software modules 116 and modules metadata 114 that includes information related to services provided by the software modules 116 and interfaces for accessing the services provided by the software modules 116. As shown, the application development platform 100 may be communicatively coupled with a computing device 140. A human developer may use the computing device 140 to develop a software application using the application development platform 100 according to various embodiments of the disclosure.

Figure 2:
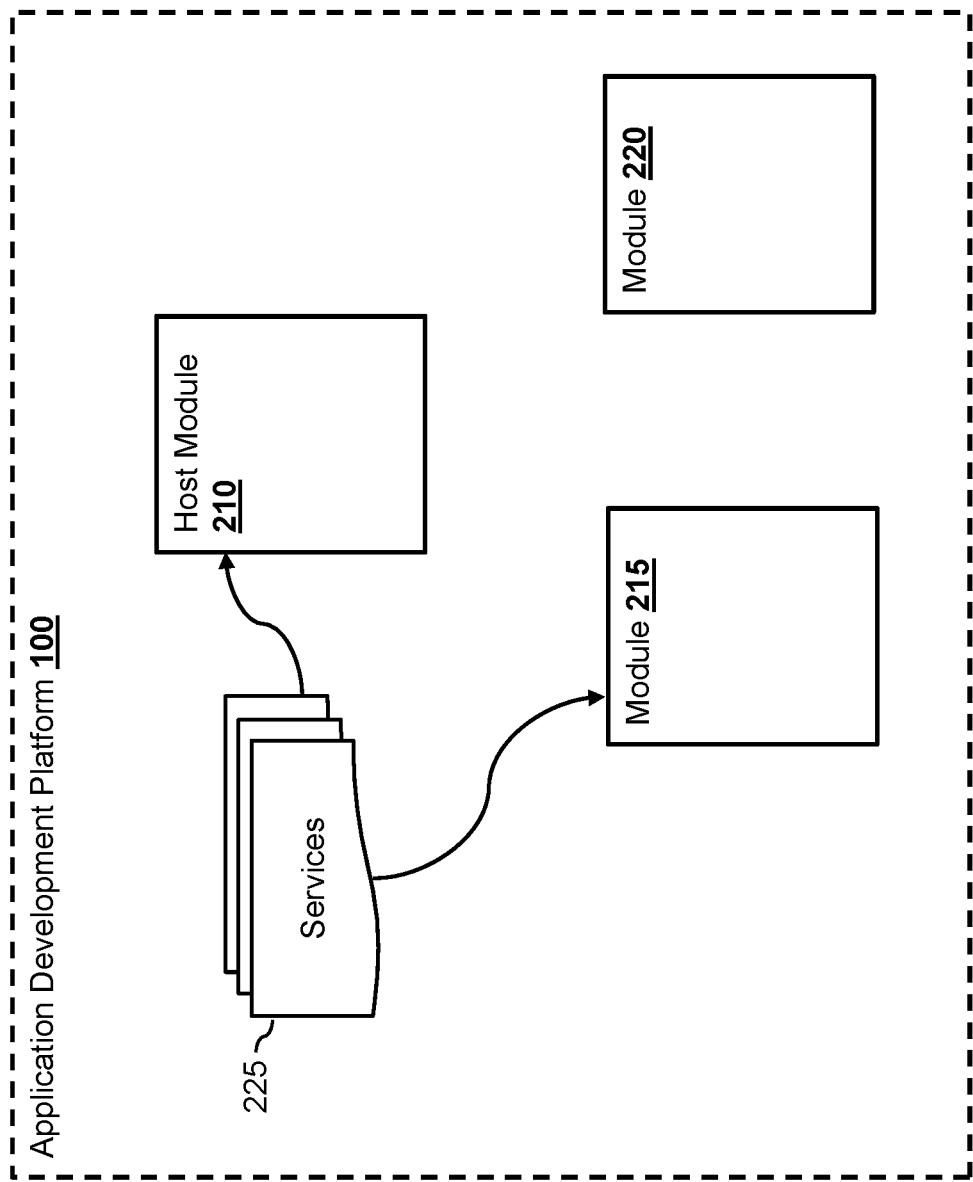
FIG. 2 illustrates an application development platform registering one or more software modules according to an embodiment of the present disclosure.

As discussed above, one or more software modules may be registered with the application development platform to provide services to applications and/or other software modules. In some embodiments, the registration of a software module is part of the process of integrating the software module into an application. For example, referring to FIG. 2, a software module 220 may be registered with the application development platform 100. The software module 220 may include programming code associated with one or more services provided by the software module 220. The software module may provide an interface (e.g., an application programming interface) for accessing the services provided by the software module 220. The interface may include one or more function calls, where each function call is associated with accessing a particular service offered by the software module 220. In some embodiments, each of the function calls may be associated with a function name and a list of data parameters required for making the function call. Each data parameter may be associated with a data type. For example, the software module 220 may provide a service for determining a credit score associated with a user account, and may provide a function call in the format of check_credit_score(account_number). In this example, the name of the function call is "check_credit_score" and the function call requires an input data parameter associated with an account number of a user account. In some embodiments, the software module 220 may require that the input data parameter is associated with an integer type. Further, the function call "check_credit_score" may provide an output (e.g., a return value) of the credit score, which is also an integer type.

Figure 3:
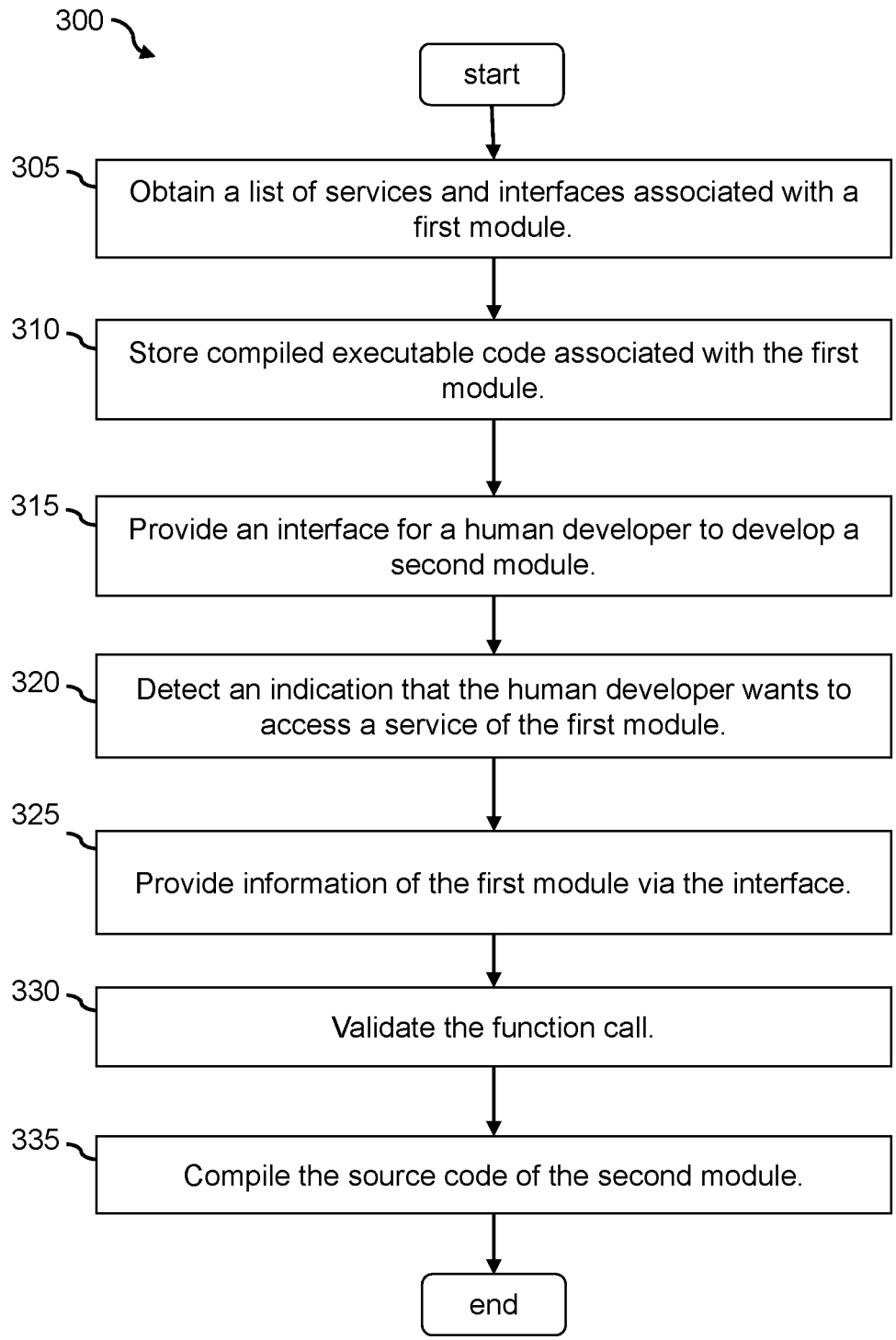
FIG. 3 is a flowchart showing a process of registering a software module with an application development platform to enable a software module to access services provided by another software module according to an embodiment of the present disclosure.

FIG. 3 illustrates a process 300 for registering a software module with the application development platform and providing access to services associated with the registered software module according to various embodiments of the disclosure. In some embodiments, the process 300 may be performed by the application development platform 100. The process 300 begins by obtaining (at step 305) a list of services and interfaces associated with a first software module. For example, during the registration of the software module 220, information related to the services provided by the software module 220 and the interface for accessing the services (e.g., information 225) may be provided to the application development platform 100 (e.g., the registration module 106). In some embodiments, when the source code of the software module 220 is available, the application development platform 100 may parse the source code to extract the information 225 related to the services provided by the software module 220 (for example, by extracting the names of the functions accessible by other modules and the parameters required by the functions). The registration module 106 of the application development platform 100 may then store the information 225 in the data store 112 as the modules metadata 114.

The process 300 then stores (at step 310) the compiled executable code associated with the first module. For example, the registration module 106 of the application development platform 100 may store the compiled executable code (e.g., binary code) associated with the software module 220 in the data store 112. Once a software module is registered with the application development platform 100, services associated with the software module may then be accessible to applications or other software modules developed within the application development platform 100. In some embodiments, the application development platform 100 provides the software development environment 102 for assisting access of the services associated with registered software modules during the development of a software module or an application. The software development environment 102 may include an interface (e.g., a user interface) for enabling a human developer to develop a software module or an application. As such, the process 300 provides (at step 315) an interface for a human developer to develop a second software module.

A human developer may use the software development environment 102 to develop a software module 215. For example, the software development environment may provide a user interface that includes an area for the human developer to input programming code associated with the software module 215. In some embodiments, the software development environment may also provide features and utilities that assist the human developer in generating the programming code for the software module 215, as will be described in more detail below. While developing the software module 215, the human developer may want to access a service provided by another software module. As such, the process 300 detects (at step 320) an indication that the human developer wants to access a service of another module (e.g., the first software module). In some embodiments, the application development platform 100 may specify a programming format for accessing services of a registered software module. The programming format may include a predetermined prefix, for example, a specific word followed by a period. Thus, as the human developer is developing the software module 215 (e.g., by inputting programming code into the interface of the software development environment 102), the application development platform 100 may parse the programming code in real-time to detect whether the specified word and a period are inputted into the user interface of the software development environment 102. In some embodiments, the application development platform 100 may determine an indication that the human developer wants to access a service of a registered module when the specified word and the period are detected in the interface.

The process 300 then provides (at step 325) information of the registered modules and services provided by the registered modules via the interface. For example, when the indication that the human developer wants to access a service of a registered module is detected, the software development environment 102 may retrieve the information related to the registered module from the data store 112 (e.g., retrieve the modules metadata 114) and provide an interface to present the information. In one embodiment, the software development environment 102 may present a pop-up window that lists the software modules that have been registered with the application development platform 100. In some embodiments, each of the listed software modules presented in the pop-up window is a selectable item. When the application development platform 100 detects a selection of a software module (e.g., the software module 220), the application development platform 100 may automatically fill-in (e.g., auto-complete) the name of the software module 220 in the programming code for the human developer.

Once a software module is selected, the application development platform 100 may present another pop-up window that lists the services provided by the selected software module. For example, the application development platform 100 may list services provided by the software module 220, including the check credit score service. Similar to the list of software modules, each of the listed services may also be a selectable item, such that when the application development platform 100 detects a selection of a service (e.g., the check credit score service), the application development platform may automatically fill-in (e.g., auto-complete) the name of the function call associated with the selected service in the programming code for the human developer. In some embodiments, in addition to filling-in the name of the function call, the application development platform 100 may also automatically fill-in the data parameter(s) required (e.g., the user account number variable) for the function call, such that the human developer does not have to manually enter the names and the parameters. Automatically filling-in the name of the software module, the name and the data parameter(s) of the function call ensures that the function call is written consistently and avoids human errors (e.g., typographical error, error in providing the wrong type of data parameter in the function call, etc.). Under this scheme, the services provided by the software module 220 may be accessed by the software module 215 without exposing the implementation (e.g., the source code) to the human developer of the software module 215.

Once the programming code associated with the function call is completed, the process 300 validates (at step 330) the function call. For example, the application development platform 100 may parse the programming code associated with the function call to ensure that there is no syntax error. The process 300 then compiles (at step 335) the source code of the second module. For example, when the development of the software module 215 is completed, the application development platform 100 may use the compiler 108 to compile the source code of the software module 215 to generate compiled executable code.

After the compiled executable code of the software module 215 is generated, the application development platform 100 may also register the software module 215 in the same manner as registering the software module 220 described above. For example, the information related to the services provided by the software module 220 and the interfaces associated with the services provided by the software module 220 may be obtained and stored in the data store 112, as modules metadata 114. The compiled executable code of the software module 220 may also be stored in the data store 112. Once registered, the services provided by the software module 215 may also be accessible by any application of software modules developed within the application development platform 100.

In addition to developing software modules, the application development platform 100 may also enable a human developer to develop an application using the software development environment 102. An application is a software program or programs that can be independently installed and operated on a computing device, such as a mobile phone. In some embodiments, the application may integrate one or more software modules into the application via the application development platform 100. The application may then access the services provided by the one or more software modules integrated into the application. Furthermore, as discussed above, some of those software modules may access services of other software modules registered with the application development platform 100. As such, the application may be configured to be a host module to facilitate the services accessing between service modules that are integrated into the application.

Figure 4:
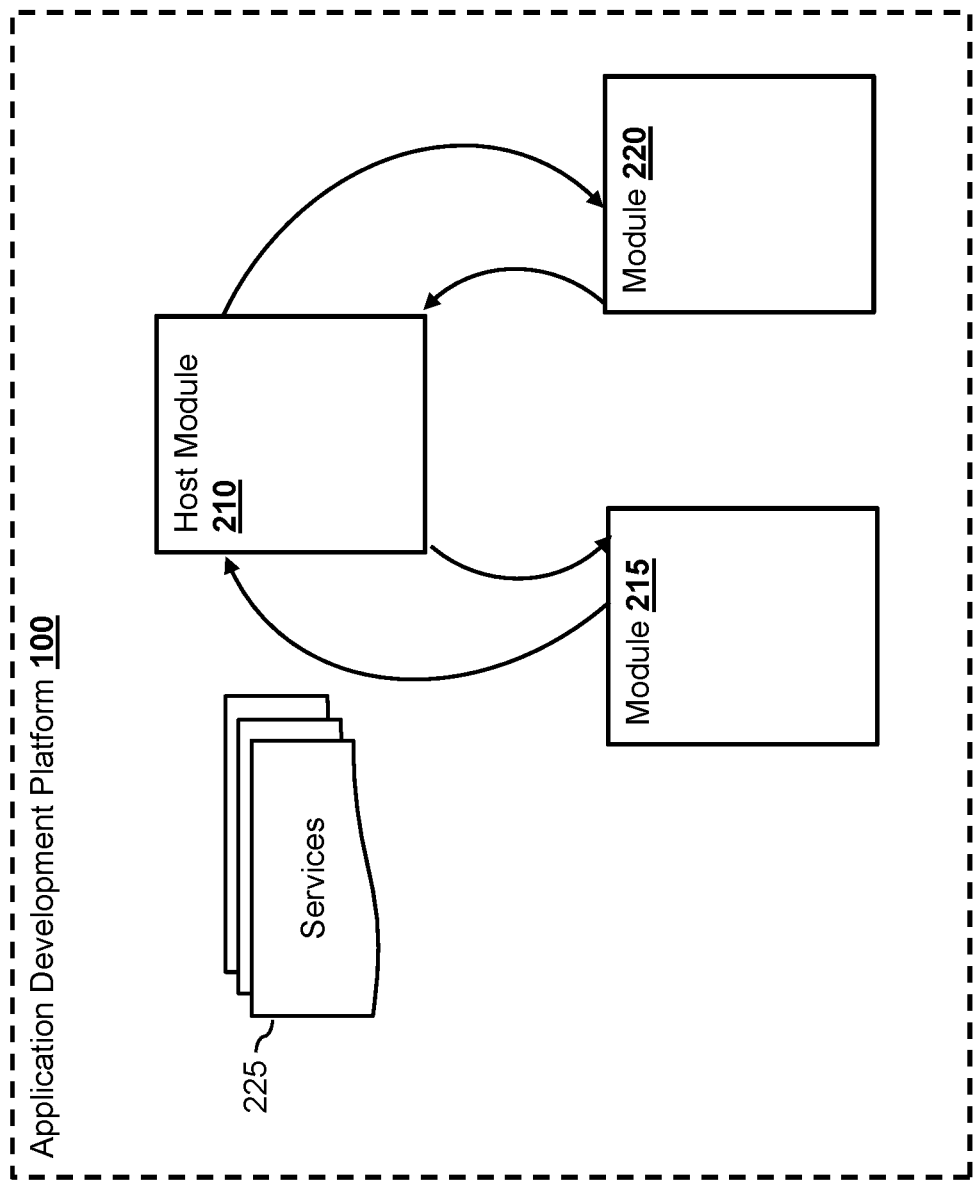
FIG. 4 illustrates an application facilitating service accessing between software modules according to an embodiment of the present disclosure.
Figure 5:
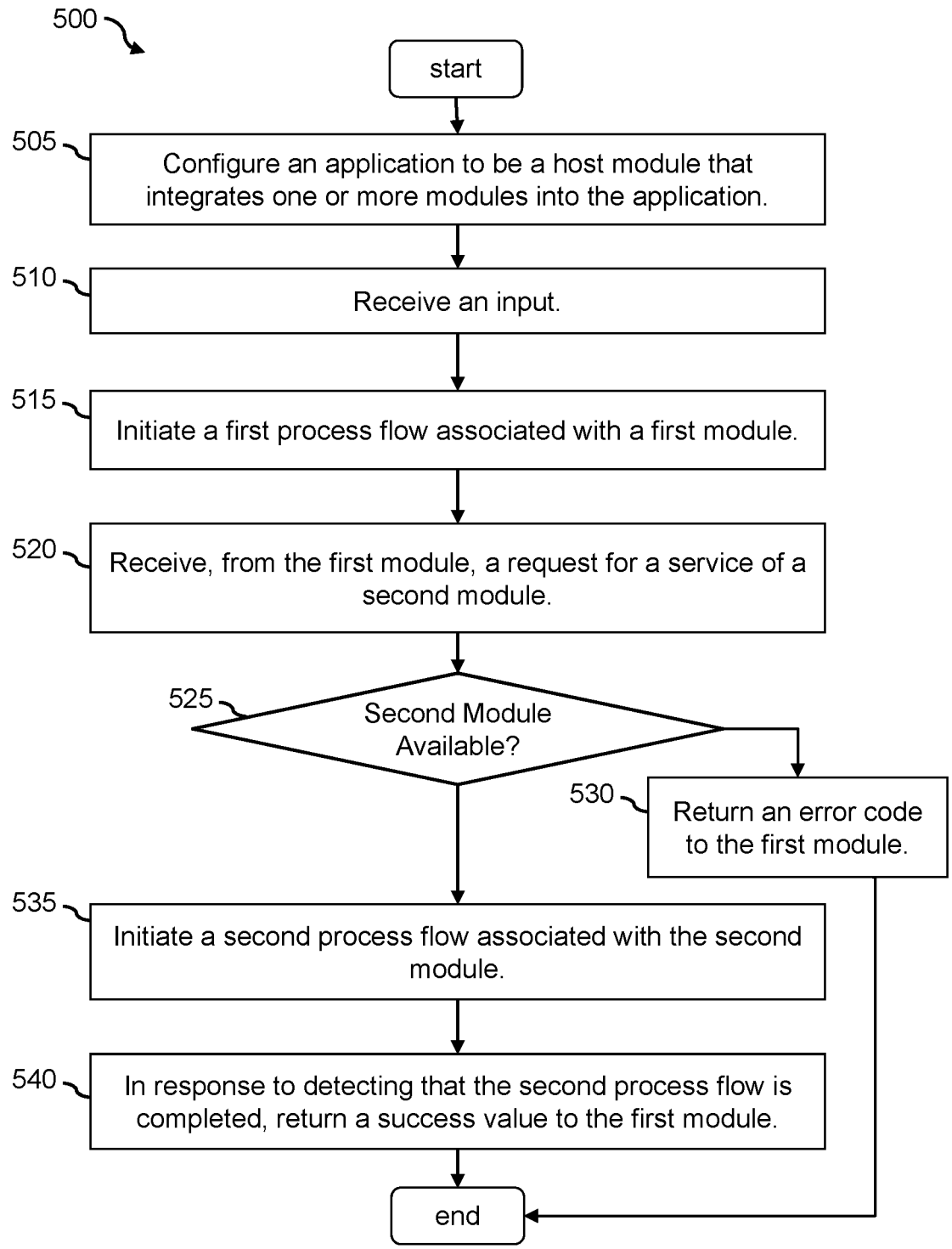
FIG. 5 is a flowchart showing a process of facilitating service accessing between software modules according to an embodiment of the present disclosure.

FIG. 4 is a block diagram of the application development platform 100 illustrating a host module 210 facilitating service accessing between software modules 215 and 220, and FIG. 5 illustrates a process 500 for configuring an application to facilitate service accessing among software modules according to various embodiments of the disclosure. In some embodiments, the process 500 may be performed by an application developed within the application development platform 100. The process 500 begins by configuring (at step 505) an application to be a host module that integrates one or more modules into the application.

In some embodiments, in order to be configured to be a host module, the application development platform 100 requires that the application specify which software module(s) to be integrated within the application, extend the host module base class 104, and implement the predetermined functions defined in the host module base class 104. For example, a human developer who develops the application may, in the programming code of the application, indicate a set of software modules (e.g., the software modules 215 and 220) to be integrated into the application (e.g., by using a predetermined programming syntax, such as "import software module A"). Based on the indication to integrate the set of software modules, the compiler 108 may incorporate the compiled executable code of the set of software modules when compiling the application, such that the compiled application package includes the compiled executable code of the application and the compiled executable code of the integrated software modules.

As discussed above, the host module base class 104 may define (e.g., provide definitions for) a set of predetermined functions. The functions may include a function for inquiring whether a service from a software module is accessible, a function for accessing a service of a software module, a function for providing a list of parameters required by a service (e.g., dependencies in a function call) of a software module, a function for indicating a requested service is completed, a function for inquiring an expected return value from a requested service, or a function for providing one or more return values based on a completion of a requested service. In some embodiments, these functions may be called by the software modules integrated with the application. For example, the programming syntax used to access a service of a software module, as discussed above in step 320 of the process 300, may correspond to one of the predetermined functions. In some embodiments, the application may implement the predetermined functions defined in the host module base class 104 by specifying actions to be performed for each of the functions.

For example, the implementation of the function for inquiring whether a service from a software module is accessible may include determining whether the software module is one of the software modules integrated with the application. If it is determined that the software module is not one of the software modules integrated with the application, the implementation of the function may include returning a first output indicating that the service is unavailable. One the other hand, if it is determined the software module is one of the software modules integrated with the application, the implementation of the function may include returning a second output indicating that the service is available.

The implementation of the function for accessing a service of a software module may include first determining whether the software module is one of the software modules integrated with the application. If it is determined that the software module is not one of the software modules integrated with the application, the implementation of the function may include returning an output indicating that the service is unavailable. One the other hand, if it is determined the software module is one of the software modules integrated with the application, the implementation of the function may include accessing the requested service of the software module, for example, by using the API (e.g., a function call) of the software module.

The implementation of the function for providing a list of parameters required by a service (e.g., dependencies in a function call) of a software module may include returning the list of parameters of the function call associated with the service, based on the modules metadata 114. The implementation of the function for providing a data type of a return value associated with a requested service may include returning a particular data type corresponding to the return value of the requested service. Further, the implementation of the function for providing one or more return values based on a completion of a requested service may include relaying the one or more return values to a software module that requested the requested service via the application.

Figure 6:
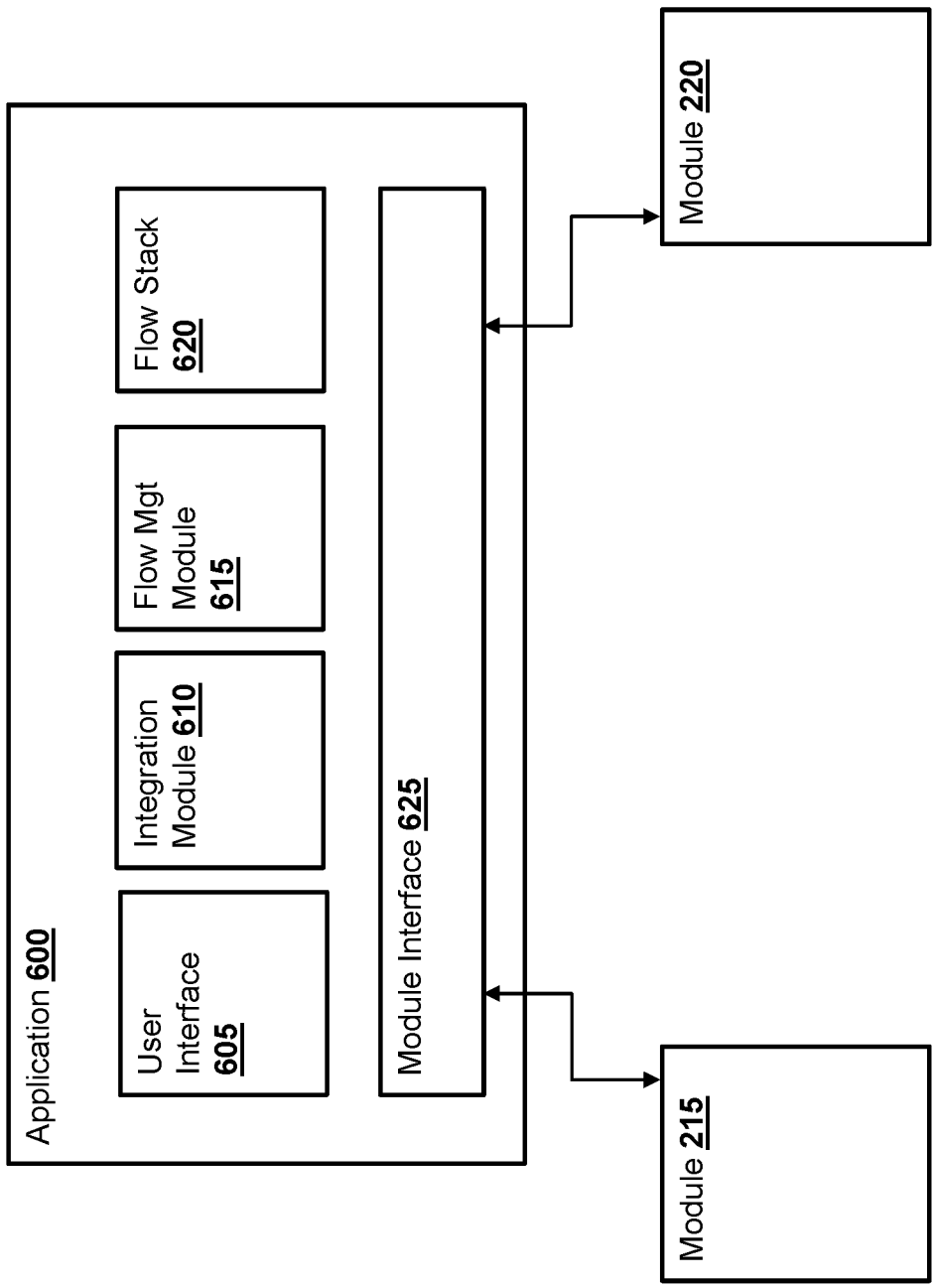
FIG. 6 is a block diagram of an application developed within an application development platform according to an embodiment of the present disclosure.

These functions defined by the host module base class 104 are made available for the software modules being developed in the application development platform 100. For example, the programming syntax for accessing a service (as illustrated in steps 320 and 325) may correspond to some of the functions defined by the host module base class 104. As such, by extending the host module base class 104 and implementing the functions, the application is configured to be a host module (e.g., a host module 210) that facilitate service accessing between multiple software modules (e.g., the software modules 215 and 220). In other words, the software modules may access services of other software modules by making these function calls to the application, which extends the host module base class. FIG. 6 illustrates an application 600 that is configured as a host module (e.g., the host module 210) for facilitating service accessing between the software modules 215 and 220. As shown, the application 600 includes a user interface 605, an integration module 610, a flow management module 615, a flow stack 620, and a module interface 625.

In some embodiments, the integration module 610 integrates the software modules 215 and 220 within the application so that the application may access services provided by the software modules 215 and 220. As discussed above, the integration module 610 may be implemented by using the pre-defined programming syntax to specify to the application development platform which software modules to be integrated within the application 600, such that the compiler

108 may incorporate the compiled executable code of the software modules 215 and 220 into the compiled executable code of the application 600. The module interface 625, in some embodiments, corresponds to the extension of the host module base class 104 and the implementation of the functions defined by the host module base class 104 as discussed herein. The module interface 625 acts as the interface to the software modules when the software modules request accesses to services provided by other software modules.

As mentioned above, the application 600 may be a stand-alone software unit that can be installed and executed on a computing device. In some embodiments, the application 600 may be associated with performing one or more services for an end-user (or an external application). For example, the application 600 may be configured to perform a process (e.g., a customer onboarding process, an electronic transaction process, a login process, etc.) based on an input. Referring back to FIG. 5, the process 500 receives (at step 510) an input. For example, the application 600 may receive a user input via the user interface 605.

The process 500 may then initiate (at step 515) a first process flow based on the input. For example, the application 600 (configured as the host module 210) may determine that the first process flow is associated with a first service provided by the software module 215. Thus, the application 600 may initiate the first process flow by accessing the first service of the software module 215, for example, via the API (e.g., a function call) of the software module 215.

Based on the function call, the software module 215 may begin performing operations associated with the first service. In some embodiments, while performing the first service, the software module 215 may desire to use a second service of the software module 220. For example, the first service may be associated with performing an electronic transaction process for a user account and the second service may be associated with determining a credit score of a user account. In this example, the software module 215 may desire to access the second service of the software module 220 to obtain the credit score of the user account while performing the first service.

In some embodiments, instead of directly accessing the software module 220 (the software module 215 may be completely unaware of the availability of the software module 220), the software module 215 may inquire about the availability of the software module 220 and access the second service of the software module 220 through the module interface 625 of the application 600. For example, the software module 215 may call one of the predetermined functions defined by the host module base class 104 to inquire whether the second service of the software module 220 is available. The software module 215 may also call another one of the predetermined functions defined by the host module base class 104 to access the second service of the software module 220.

In step 520, the process 500 receives, from the first module, a request for a service of a second module. For example, the application 600 may receive a request from the software module 215 to access the second service of the software module 220 (e.g., via the function call to access the second service of the software module 220). The process 500 then determines (at step 525) whether the second module is available, and returns an error code to the first module if it is determined that the second module is unavailable. For example, based on the implementation of the function for accessing a service of the software module 220, the application 600 may first determine whether the software module 220 is one of the software modules that have been integrated with the application 600. If it is determined that the software module 220 is not one of the software modules that have been integrated with the application 600, the application 600 may return an output that indicates to the software module 215 that the second service is unavailable. Once such an output is received, the software module 215 may perform a corresponding action. For example, the software module 215 may attempt to access another service, such as a service provided by another software module. The software module 215 may instead perform the second service itself.

On the other hand, if it is determined that the second module is available, the process 500 initiates (at step 535) a second process flow associated with the second service of the second module. For example, if it is determined that the software module 220 is one of the software modules integrated with the application 600, the application 600 may initiate a second process flow by accessing the second service of the software module 220. In one example, the application 600 may access the second service via the API (e.g., a function call) provided by the software module 220.

Based on the function call, the software module 220 may begin performing operations associated with the second service. While performing the operations associated with the second service, the software module 220 may access a service of another software module in the same manner discussed above, via the module interface 625 that implements the functions defined by the host module base class 104. When the software module 220 finishes performing the operations associated with the second service, the software module 220 may notify, via the module interface 625, the application 600 that the second service is completed. In some embodiments, the software module 220 may notify the application 600 of the completion of the second service by returning from the function call made by the application 600. In some embodiments, the application 600 may be implemented as threads such that the thread that made the function call of the software module 220 may terminate upon calling the function, without waiting for the function to return. In these embodiments, the software module 220 may notify the application by making another function call defined by the host module base class 104 (e.g., a function for indicating a requested service is completed).

The process 500 then returns (at step 540) a success value to the first module in response to detecting that the second process flow is completed. For example, the application 600 may return from the function call made by the software module 215. In some embodiments, based on whether the second service is completed successfully or not, the application 600 may provide a corresponding value as a return value to the function call made by the software module 215. The return value may indicate to the software module 215 whether the second service has been performed successfully.

In some embodiments, the software module 220 may provide one or more values (e.g., one or more return values) at the completion of the second service. For example, if the second service is associated with determining a credit score for a user account, the software module 220 may provide a numeric value representing the credit score of the user account at the completion of the second service. The software module 220 may provide the credit score value as a return value of the function call initiated by the application 600. In some embodiments, the software module 220 may make another function call defined by the host module base class 104 (e.g., the function for providing one or more return values based on a completion of a requested service). As such, upon receiving the one or more values from the software module 220, the application 600 may relay the one or more values to the software module 215. For example, the application 600 may use the one or more values as the return values of the function call made by the software module 215. In these embodiments, a positive return value from the function call may represent the credit score for the software module 215, and a negative value from the function call may indicate to the software module 215 that the second service was not performed successfully.

As discussed above, once the application 600 has initiated the first process flow (e.g., by accessing the first service provided by the software module 215 in step 515), the application 600 may be called upon to initiate additional process flows associated with service provided by different software modules integrated with the application (e.g., accessing the second service provided by the software module 220 in step 535). It is contemplated that during the execution of the second process flow, the application 600 may be requested by the software module 220 to access a service provided by yet another software module (e.g., a third software module), the third software module may also request the application 600 to access a service by a fourth software module, and so forth. As such, the application 600 may have to manage and keep track of the different process flows initiated for the different software modules.

Different embodiments of the platform may use different techniques to enable the application to manage the process flows. In some embodiments, the application development platform 100 provides the flow stack 620 that the application may use to keep track of the process flows. The flow stack 620 may be implemented as a data stack object configured in a first-in-last-out arrangement such that the most recent item that has been pushed into the flow stack 620 is popped first. In some embodiments, whenever the application 600 initiates a new process flow (e.g., by accessing a service of one of the software module), the flow management module 615 of the application 600 may instantiate a new instance of the flow stack 620 and push information about the process flow into the flow stack. For example, when the application 600 initiates the first process flow by accessing the first service of the software module 216 (e.g., at step 515), the flow management module 615 of the application 600 may instantiate a first instance of the flow stack 620 and push information about the first process flow into the first instance of the flow stack 620. The information may include an identifier associated with the first service, an identifier associated with the software module 215, and an identifier of the requestor (which is the application 600 itself in this instance). As the application 600 is requested to initiate the second process flow (e.g., being called upon by the software module 215 to access the second service of the software module 220 via the module interface 625 at steps 520-535), the application 600 may push information of the second process flow into the first instance of the flow stack 620. The information may include an identifier associated with the second service, an identifier associated with the software module 220, and an identifier of the requestor (the software module 215 in this instance).

The application 600 may continually push information of new process flows into the first flow stack when requests for initiating the new process flows are received. For example, the software module 220 may request to access a third service provided by a third software module while performing operations associated with the second service, and the third software module may also request to access a fourth service provided by a fourth software module while performing the third service, and so forth. The additional process flows (after the first process flow initiated directly by the application) may be referred to as sub-flows of the first process flow.

In some embodiments, when a process flow is completed, the application 600 may pop the information associated with the process flow from the first instance of the flow stack 620. For example, when the application 600 is notified by the software module 220 that the second process flow is completed, the application 600 may pop the information associated with the second process flow (since the information associated with the second process flow is the last one that was pushed into the first instance of the flow stack 620) from the first instance of the flow stack 620. Based on the information that was popped from the first instance of the flow stack 620, the application 600 may determine that the second process flow is requested by the software module 215, and may then notify the software module 215 of the completion of the second process flow and may relay any value(s) provided by the second software module at the completion of the second process flow, for example, in a manner described above by reference to step 540.

FIG. 7 is a block diagram of a computer system 700 suitable for implementing one or more embodiments of the present disclosure, including the application development platform 100 and the computing device 140. In various implementations, the user device 140 may include a mobile cellular phone, personal computer (PC), laptop, wearable computing device, etc. adapted for wireless communication, and the application development platform 100 may include a network computing device, such as a server. Thus, it should be appreciated that the devices 100 and 140 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present an interface of the software development environment 102. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the functionalities described herein according to the processes 300 and 500.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A software integration platform, comprising:
   a non-transitory memory; and
   one or more hardware processors coupled to the non-transitory memory and configured to read instructions from the non-transitory memory to cause the software integration platform to perform operations comprising:
      receiving, from a user device via a user interface, programming code associated with an application;
      parsing the programming code from the user device;
      detecting, based on the parsing the programming code, an indication of an intent to utilize one or more software modules of a plurality of software modules in the application;
      in response to detecting the indication, presenting, on the user interface, a first plurality of selectable elements corresponding to the plurality of software modules;
      receiving a selection of a first selectable element of the first plurality of selectable elements, wherein the first selectable element corresponds to a first software module of the plurality of software modules;
      determining a plurality of function calls associated with the first software module based on the selection, wherein the plurality of function calls comprises a first function call for inquiring an availability of one or more services from the first software module, a second function call for requesting a list of input parameters required by the first software module to perform the one or more services, and a third function call for inquiring an expected return value from the one or more services;
      presenting, on the user interface, a second plurality of selectable elements corresponding to the plurality of function calls associated with the first software module;
      in response to receiving a selection of the first function call for inquiring the availability of the one or more services from the first software module, providing a software programming structure in the programming code for accessing a second software module different from the first software module when the one or more services from the first software module is not available; and
      integrating the first function call of the first software module and the software programming structure into the application.

2. The software integration platform of claim 1, wherein the indication includes one or more characters corresponding to a command associated with initiating a service corresponding to the one or more software modules of the plurality of software modules.

3. The software integration platform of claim 1, wherein the indication includes a selection of a button appearing on the user interface.

4. The software integration platform of claim 1, wherein the operations further comprise integrating, within the programming code associated with the application, code for initiating the one or more services of the first software module when a return value of the first function call indicates that the one or more services is available.

5. The software integration platform of claim 1, wherein the operations further comprise:
inserting, within the programming code associated with the application, code for initiating the one or more services of the first software module based on a list of input parameters returned from the second function call.

6. The software integration platform of claim 1, wherein the operations further comprise:
inserting, into the programming code associated with the application and based on an expected return value from the third function call, code for initiating the one or more services and a command for providing one or more return values from the one or more services to a third software module.

7. The software integration platform of claim 1, wherein the software integration platform is configured to be a host module for the plurality of software modules.

8. A method comprising:
providing, by one or more hardware processors associated with a software integration platform, a user interface that enables programming code associated with an application to be received from a user device;
detecting, by the one or more hardware processors based on parsing the programming code, an indication of an intent to utilize one or more software modules of a plurality of software modules in the application;
in response to detecting the indication, presenting, by the one or more hardware processors on the user interface, a first plurality of selectable elements corresponding to the one or more software modules;
receiving, by the one or more hardware processors, a selection of a first selectable element of the first plurality of selectable elements, wherein the first selectable element corresponds to a first software module of the one or more software modules;
determining, by the one or more hardware processors, a plurality of functions associated with the first software module based on parsing source code associated with the first software module, wherein the plurality of functions comprises a first function for inquiring an availability of one or more services from the first software module, a second function for requesting a list of input parameters required by the first software module to perform the one or more services, and a third function for inquiring an expected return value from the one or more services;
presenting, by the one or more hardware processors on the user interface, a second plurality of selectable elements corresponding to the plurality of functions associated with the first software module;
in response to receiving a selection of the first function for inquiring the availability of the one or more services from the first software module, providing a software programming structure in the programming code for accessing a second software module different from the first software module when the one or more services from the first software module is not available; and
integrating, by the one or more hardware processors, the first function of the first software module and the software programming structure into the application.

9. The method of claim 8, wherein the indication includes a partial command associated with initiating a service corresponding to the one or more software modules of the plurality of software modules.

10. The method of claim 8, wherein the indication includes a selection of an interface element on the user interface.

11. The method of claim 8, further comprising integrating, within the programming code associated with the application, code for initiating the one or more services of the first software module when a return value of the first function indicates that the one or more services is available.

12. The method of claim 8,
further comprising integrating, within the programming code associated with the application, code for initiating the one or more services of the first software module based on a list of input parameters returned from the second function.

13. The method of claim 8,
further comprising inserting, into the programming code associated with the application and based on an expected return value from the third function, code for initiating the one or more services of the first software module and a command for providing one or more return values from the one or more services to a third software module.

14. The method of claim 8, wherein the software integration platform is configured to be a host module for the plurality of software modules.

15. A non-transitory machine-readable medium having stored thereon machine-readable instructions executable to cause a machine to perform operations comprising:
receiving, from a user device via a user interface, programming code;
parsing the programming code;
detecting, based on the parsing, an indication of an intent to utilize one or more software modules of a plurality of software modules in the application;
in response to the detecting the indication, presenting, on the user interface, a first plurality of selectable elements corresponding to the one or more software modules;
receiving a selection of a first selectable element of the first plurality of selectable elements, wherein the first selectable element corresponds to a first software module of the one or more software modules;
determining a plurality of function calls associated with the first software module based on the selection, wherein the plurality of function calls comprises a first function call for inquiring an availability of one or more services from the first software module, a second function call for requesting a list of input parameters required by the first software module to perform the one or more services, and a third function call for inquiring an expected return value from the one or more services;
presenting, on the user interface, a second plurality of selectable elements corresponding to the plurality of function calls associated with the first software module;
in response to receiving a selection of the first function call for inquiring the availability of the one or more services from the first software module, providing a software programming structure in the programming code for accessing a second software module different from the first software module when the one or more services from the first software module is not available; and
integrating the first function call of the first software module and the software programming structure into the application.

16. The non-transitory machine-readable medium of claim 15, wherein the indication includes a partial command for initiating a service corresponding to the one or more software modules of the plurality of software modules.

17. The non-transitory machine-readable medium of claim 15, wherein the indication includes a selection of a button appearing on the user interface.

18. The non-transitory machine-readable medium of claim 15, wherein the operations further comprise integrating, within the programming code associated with the application, code for initiating the one or more services of the first software module when a return value of the first function call indicates that the one or more services is available.

19. The non-transitory machine-readable medium of claim 15, wherein the operations further comprise:
   inserting, within the programming code associated with the application, code for initiating the one or more services of the first software module based on a response of the second function call.

20. The non-transitory machine-readable medium of claim 15, wherein the operations further comprise:
   inserting, into the programming code associated with the application and based on the expected return value from the third function call, code for initiating the one or more services and a command for providing one or more return values from the one or more services to a third software module.

* * * * *